United States Patent [19]
Jarvis et al.

[11] Patent Number: 5,831,217
[45] Date of Patent: Nov. 3, 1998

[54] WIRE BUNDLE SEALING SYSTEM HAVING INDIVIDUAL TUBULAR SEGMENTS GATHERED AROUND THE WIRE BUNDLES AND CONTAINING SEALANT

[75] Inventors: Robert K. Jarvis, Renton; Woodrow H. Alford, Lynnwood, both of Wash.

[73] Assignee: The Boeing Company, Seattle, Wash.

[21] Appl. No.: 559,541

[22] Filed: Nov. 16, 1995

[51] Int. Cl.[6] .................................................. H01B 17/26
[52] U.S. Cl. .................... 174/153 R; 174/76; 174/77 R; 277/227
[58] Field of Search ............................... 174/157, 153 R, 174/65 R, 65 SS, 77 R, 65 G, 76, 152 R, 152 G, 153 G; 277/178, 227, 101

[56] References Cited

U.S. PATENT DOCUMENTS

| | | | |
|---|---|---|---|
| 2,247,671 | 7/1941 | Tepel | 174/20 |
| 2,672,500 | 3/1954 | Bondon | 174/153 R |
| 3,614,295 | 10/1971 | Gillemot | 174/87 |
| 3,919,460 | 11/1975 | Neail et al. | 174/87 |
| 3,998,478 | 12/1976 | Zopfi | 285/110 |
| 4,226,432 | 10/1980 | Nakamizo | 277/212 F |
| 4,301,325 | 11/1981 | Hutchison | 174/76 |
| 4,329,540 | 5/1982 | Howarth | 174/53 R |
| 4,431,198 | 2/1984 | Beinhaur et al. | 277/1 |
| 4,538,020 | 8/1985 | Tucker | 174/65 R |
| 4,607,469 | 8/1986 | Harrison | 52/220.8 |
| 5,266,742 | 11/1993 | Heier et al. | 174/93 |

FOREIGN PATENT DOCUMENTS 2 104 736   3/1983   United Kingdom.

*Primary Examiner*—Kristine L. Kincaid
*Assistant Examiner*—Kamand Cuneo
*Attorney, Agent, or Firm*—Christensen O'Connor Johnson & Kindness PLLC

[57] ABSTRACT

A conventional feedthrough connector having a plurality of separate passages is secured in a hole in a bulkhead, followed by feeding separate wire bundles through the separate passages. Two potting dams are secured to the connector, one at each side of the bulkhead. Each potting dam has a collar encircling a projecting cylindrical stem of the connector and tightly secured thereto, and separate integral tubular segments encircling the wire bundles, respectively. The tubular segments are soft pliant material and are gathered tightly around the wire bundles. Settable sealant is injected through a conduit that opens into the collars to fill the collars and the connector passages, and thereby seal the wire bundles in the connector.

15 Claims, 6 Drawing Sheets

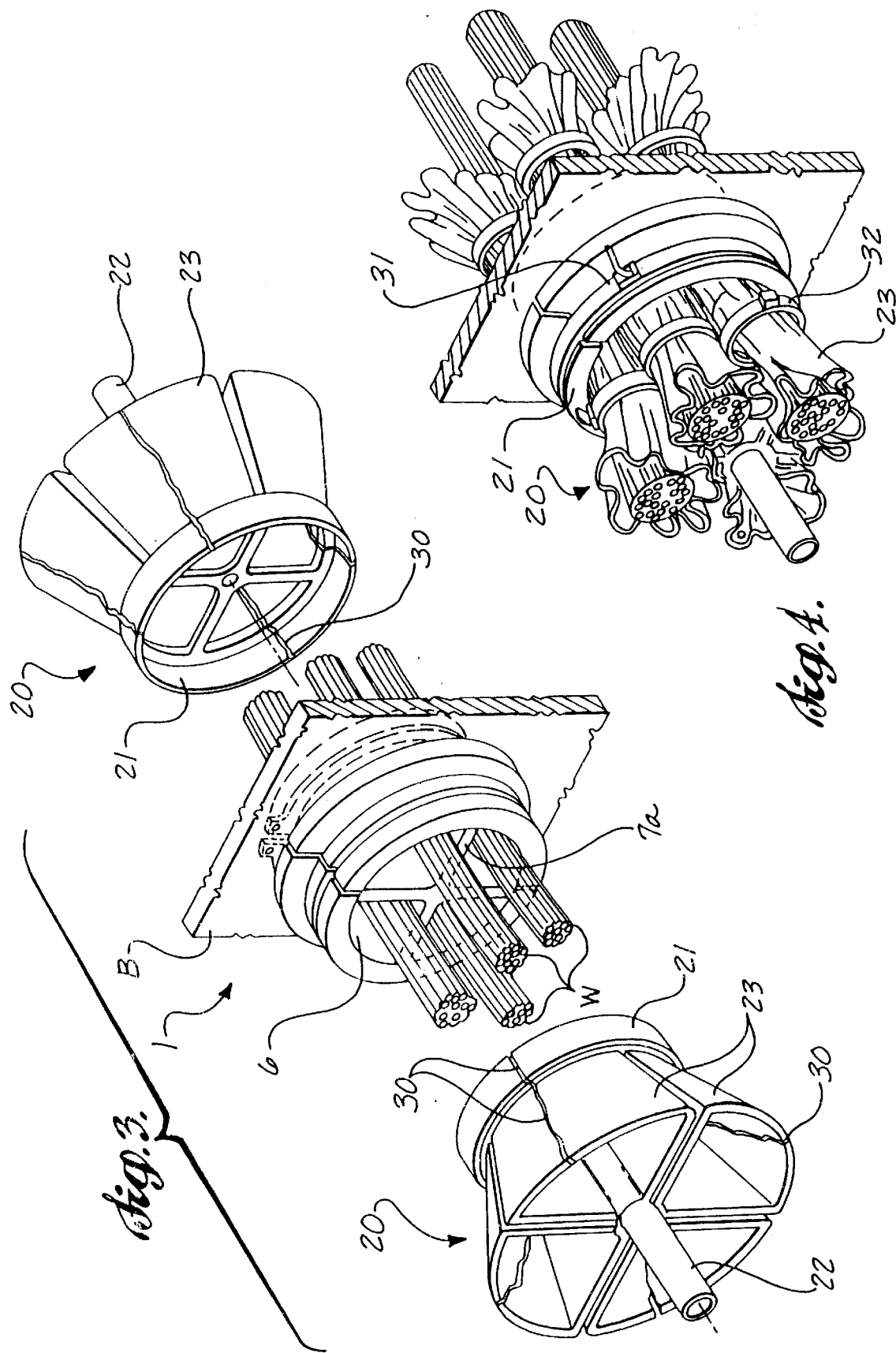

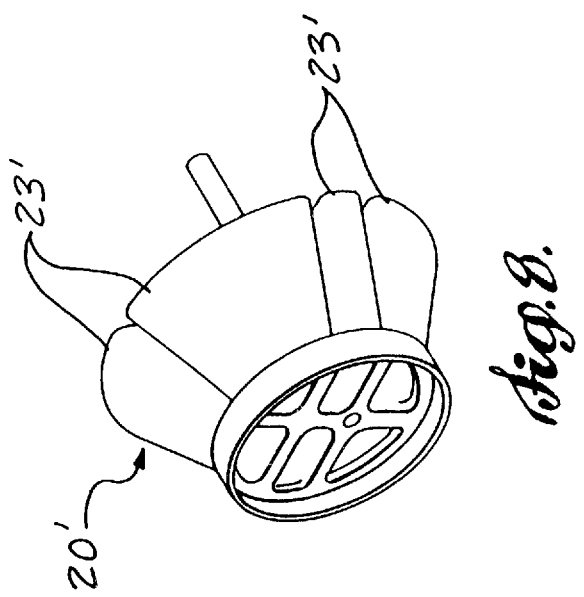
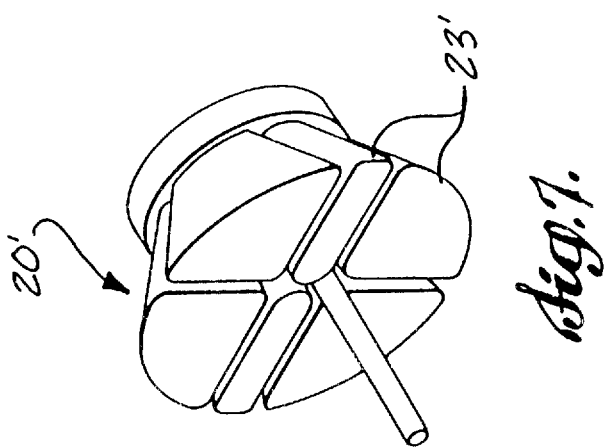

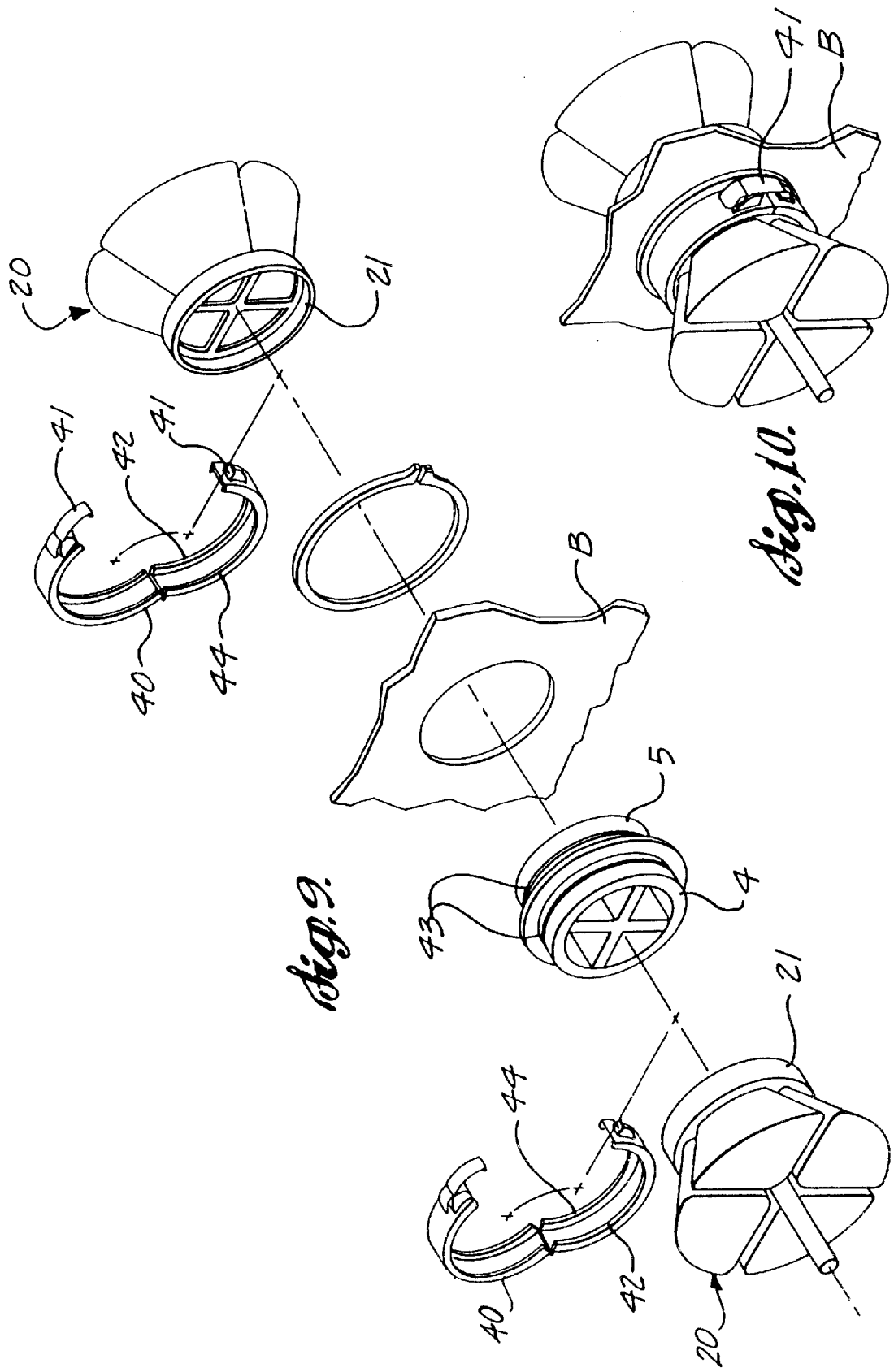

5,831,217

WIRE BUNDLE SEALING SYSTEM HAVING INDIVIDUAL TUBULAR SEGMENTS GATHERED AROUND THE WIRE BUNDLES AND CONTAINING SEALANT

FIELD OF THE INVENTION

The present invention relates to a method and apparatus for sealing separated wire bundles that extend through a multiple passage bulkhead feedthrough.

BACKGROUND OF THE INVENTION

The type of bulkhead with which the present invention is concerned is a partition between adjacent compartments for sealing one compartment from another. For example, in airplane construction bulkheads are used to isolate adjacent compartments, such as to permit and maintain pressure differences between the compartments, or to prevent passage of gases from one compartment to another, or to isolate one or both compartments for safety purposes. However, it is necessary for components such as wire bundles to pass through the bulkhead. Again using the example of airplane construction, a known rigid "feedthrough connector" has a large axial bore and is designed to seat in a hole through the bulkhead to form one or more open passages for one or more wire bundles. In the known feedthrough connector, a divider or "wire separator" is retained in the bore of the connector to define discrete passages for maintaining separation of different bundles.

The known feedthrough connector is designed to accommodate a variety of wires and wire bundles. Typically, the bundles are fed through the passages and fit loosely in them. Thereafter, the feedthrough connector passages must be sealed.

In the past, the wire bundles were gathered at both sides of the feedthrough connector, a few inches from it. Plastic tape was used to hold the bundles together. The tape was spiraled around the bundles toward the feedthrough connector to form a generally conically shaped funnel or mold at each side of the connector. The funnels were then filled with sealant which would flow through the connector and, ideally, provide the desired seal.

The system described above used a large quantity of sealant which is expensive and adds to the overall weight of the aircraft. In addition, the gathered bundles may not meet separation requirements. Further, the sealant would not always penetrate between individual wires of each bundle, such that unacceptable leakage could occur lengthwise of a bundle, necessitating reworking of the seal. All in all, the known system was labor intensive in forming the seals, testing the seals and, when necessary, reworking the seals.

SUMMARY OF THE INVENTION

The present invention provides a system for sealing wire bundles extending through segmented bulkhead feedthroughs, which system reduces the time required to produce the seals and simplifies the manner of producing the seals. The resulting seals are more uniform and reliable in establishing the desired isolation between adjacent compartments separated by the bulkhead, and require less sealing compound, resulting in decreased weight.

In the preferred embodiment, a specialized potting dam is secured at opposite sides of the otherwise conventional feedthrough connector. The potting dam is formed of a soft, pliable, tear-resistant material and has elongated tubular passages or segments aligned with the passages of the feedthrough connector. Each segment has a continuous peripheral wall for encircling a single wire bundle. The segments are gathered around the bundles close to the connector, such that bundle separation is maintained while sealant is injected through a central conduit of the dam. A minimal amount of sealant is required, and the sealant can be injected under a pressure sufficient to assure that the sealant penetrates the bundles for an effective seal. After the sealant sets, the potting dam can be removed so that it does not add to the weight of the final seal. Preferably, the potting dam is reusable.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 3 and FIG. 4 are top perspectives corresponding to FIG. 2 but with parts in different positions, illustrating sequential steps leading up to formation of a seal by the system of the present invention;

FIG. 7 is a front perspective of an alternative potting dam usable in the sealing system of the present invention;

FIG. 8 is a rear perspective of the potting dam shown in FIG. 7;

FIG. 9 is a top perspective of the conventional feedthrough connector and potting dams of FIG. 2, but with an additional component, namely, a clamp for securing a potting dam to the connector, with parts shown in exploded relationship;

FIG. 10 is a top perspective corresponding to FIG. 9, but with all parts assembled.

DETAILED DESCRIPTION OF THE PREFERRED EMBODIMENT

Figure 1:
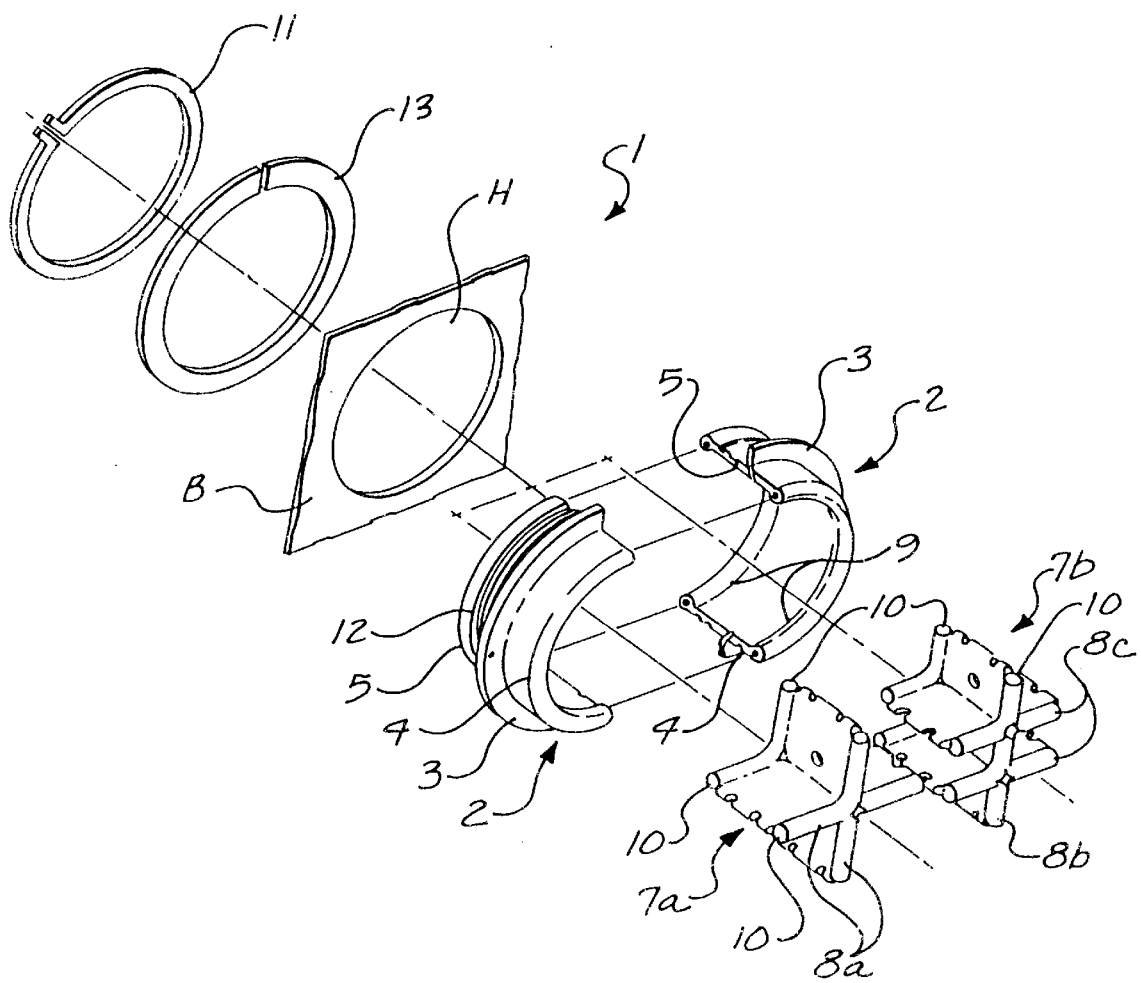
FIG. 1 is a perspective of a conventional feedthrough connector, with parts shown in exploded relationship.

With reference to FIG. 1, the wire bundle sealing system in accordance with the present invention uses a conventional nylon feedthrough connector 1 including a cylindrical body formed of two identical semicylindrical halves 2. Such halves meet along an axial plane and form a continuous sidewall. An integral annular flange 3 projects outward from the sidewall approximately midway between the opposite ends of the connector body. The connector body defines a first cylindrical stem 4 projecting in one direction from the flange and a second cylindrical stem 5 projecting in the opposite direction from the flange. A large central bore extends through the connector body.

Prior to securing the two halves 2 together, a divider or wire separator 7a or 7b is inserted in the bore. Separator 7a includes four mutually perpendicular radial partitions 8a to divide the bore through the connector body into four separate passages. Alternatively, separator 7b is used which includes a diametrical wall 8b and two pairs of aligned walls 8c which are spaced apart lengthwise of wall 8b so as to divide the bore of the connector body into six separate passages. The selected separator 7a or 7b interfits with the connector body such that the separator is captured in the body when the two connector halves are joined. For example, the body of the connector can have an inward projecting rib 9 at each end which interfits with grooves 10 at the free ends of the partitions 8a, 8b, 8c.

The assembled connector body with the selected separator is inserted through a circular hole H of a bulkhead B. Hole H is sized to closely receive the cylindrical stem 5, such that insertion of the connector body through the hole is limited by engagement of the flange 3 with the bulkhead. In this position, stem 5 projects through the hole and beyond the opposite side of the bulkhead.

The feedthrough connector body is held in position by a snap ring 11 which fits in a peripheral groove 12 of stem 5. With reference to FIG. 1, if required for the particular application, a resilient sealing ring or shim 13 is interposed between the snap ring 11 and the adjacent side of the bulkhead such that there is a tight fit of the connector in the bulkhead.

FIG. 3 illustrates the connector 1 secured to the bulkhead B. The wire separator (in this case separator 7a) defines separate passages 6 for wire bundles W. The separator helps to maintain separation between different bundles, which may be required for assuring integrity of signals passed by the wires or to otherwise prevent electrical interference or to assure a desired degree of isolation. When all required wires have been passed through the feedthrough connector, it is then necessary to seal the wires therein. For example, a settable potting compound can be used, such as a PVC compound, preferably a polysulfide rubber compound. Prior methods for sealing the wire bundles in the feedthrough connector have used large amounts of the potting compound, and have not always resulted in the desired seal.

Figure 2:
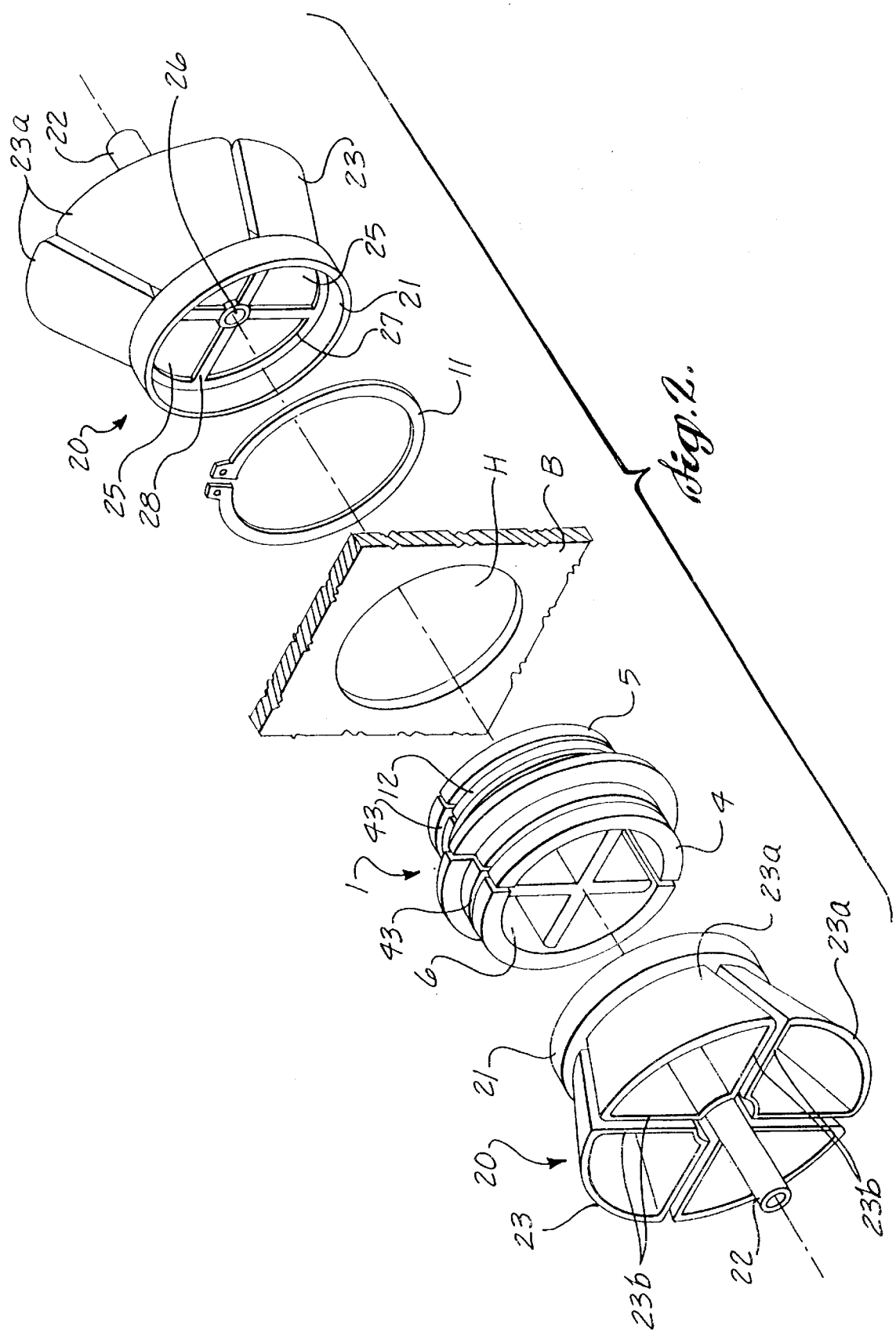
FIG. 2 is a top perspective of the feedthrough connector of FIG. 1, with some parts assembled for insertion through a hole in a bulkhead, and a pair of potting dams usable in the wire bundle sealing system in accordance with the present invention.

With reference to FIG. 2, in accordance with the present invention novel potting dams 20 are fitted tightly around the connector stems 4 and 5 and wire bundles W to define a relatively small, central space for retaining potting compound under a pressure sufficient to assure penetration of the compound into the bundles. Each potting dam 20 includes a base having a cylindrical collar 21 sized to fit snugly over a stem 4 or 5 of the installed feedthrough connector 1. A small diameter axial conduit 22 opens into the center of the collar. A plurality of integral tubular segments 23 are disposed around the conduit 22. Each segment 23 consists of a continuous peripheral wall that includes an outer wall portion 23a exposed at the circumference of the potting dam. Adjacent inner wall portions 23b of adjacent segments are spaced apart slightly. The base of each wall is integral with the end of the potting dam having the collar 21. Tubular segments 23 have cross sections corresponding to the cross sections of the passages through the connector.

Preferably each potting dam is molded in one piece of a soft, pliable, tear-resistant polymer. The two-part polyethylene sold under the trademark Conothane TU-600 is an acceptable material, using a mix ratio of 100 pbw (parts by weight) of Part A and 77 pbw of Part B. Such material can be cured in the mold for two hours at 80° C., followed by unmolded final curing for 16 hours at 80° C. The resulting part has the required characteristics of being pliable and soft, with a Shore A hardness of about 55 to about 65, preferably about 60, and high tear strength.

During molding of potting dams 20, a thin but strong end wall 25 is formed between the interior of the collar 21 and the interior of each tubular segment 23. No end wall is formed in the opening 26 between the interior of the collar and the interior of the conduit 22. A circumferential reinforcement rib 27 is formed in alignment with the outer or circumferential portions 23a of the segments 23, and radial or cross ribs 28 are formed in alignment with the generally radial inner portions 23b of the segment walls.

With reference to FIG. 3, the potting dams 20 can be installed on the feedthrough connector 1 after all desired wire bundles W have been passed therethrough. FIG. 3 illustrates four separate bundles passing, respectively, through the four separate passages 6. However, in a particular application, there may be fewer wire bundles than passages.

To install the potting dams 20 on a feedthrough connector 1, a longitudinal slit 30 is cut lengthwise along the circumferential wall portion 23a of each segment 23 for which a wire bundle W extends through the corresponding passage of the connector. The end wall 25 at the base of each such segment 23 is removed. The potting dam then can be manipulated to a position in which each wire bundle is fitted in a separate segment 23, while unused segments remain closed and unsevered. In general, the base of each segment 23 is of the same cross-sectional size and shape as the corresponding passage 6 through the feedthrough connector. From its base, the circumferential wall portion of each segment flares outward slightly to assure that the marginal portions adjacent to the slits 30 will overlap and close the slit.

With reference to FIG. 4, the collars 21 of the potting dams fit snugly over the corresponding stem of the feedthrough connector and can be held tightly in place by a conventional ratcheting cable tie or strap 31. The segments 23 through which wire bundles pass are gathered tightly around their wire bundles and are clamped in position by shorter ratcheting cable ties or straps 32, preferably close to the feedthrough connector. In addition, the conduit 22 of one dam preferably is gathered with one of the segments 23 so that it is closed by the associated strap 32.

Figure 5:
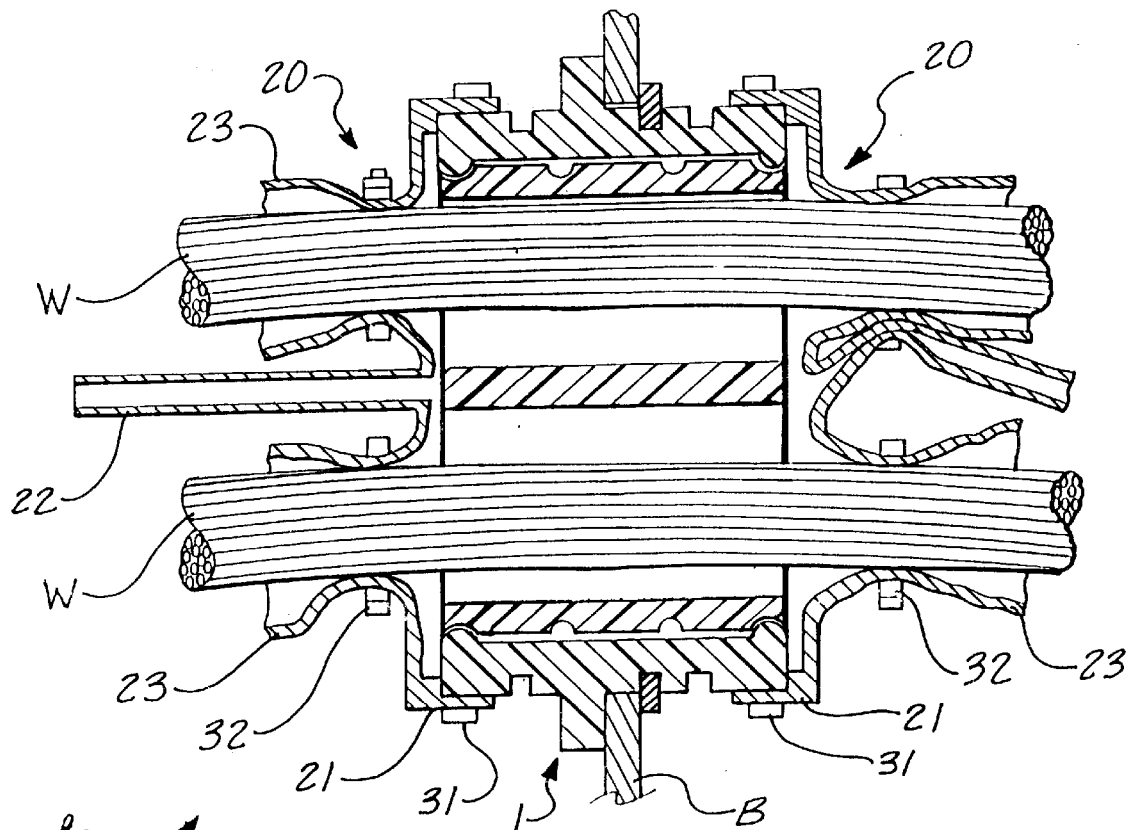
FIG. 5 is an axial section through component parts of the sealing system in accordance with the present invention, assembled to the condition illustrated in FIG. 4.
Figure 6:
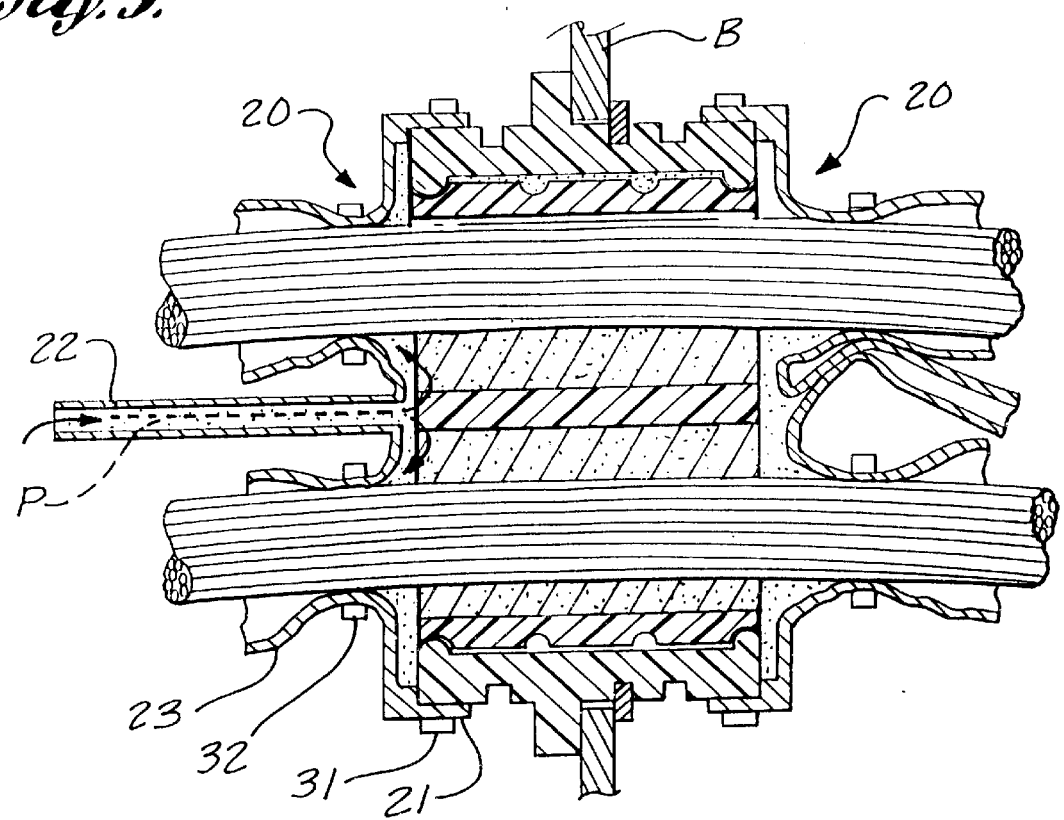
FIG. 6 is an axial section corresponding to FIG. 5, illustrating an additional step in formation of a seal by the system of the present invention, namely, injection of sealant.

FIG. 5 shows the positioning of the connected parts. It will be seen that the potting dams 20 define a small, closed core space, with each wire bundle W tightly encircled by the associated soft, pliable tubular segment 23. As illustrated in FIG. 6, the desired potting compound P then is injected through whichever of the central conduits 22 has not been closed. The potting compound can be injected at a pressure sufficient that it will penetrate between individual wires of each wire bundle and achieve a reliable seal.

After the potting compound has set, preferably the cable ties 31 and 32 are cut and the potting dams are removed. The material used for the potting dams and the particular potting compound selected preferably permit an easy separation of the potting dams from the potting compound, or a suitable release agent can be used. In either case, the potting dams will be reusable for a feedthrough having the same number of wire bundles or more.

In the case of a six-way feedthrough connector (utilizing the separator 7b shown in FIG. 1), the preferred construction for the potting dams is shown in FIGS. 7 and 8. Six segments 23' are provided, each of approximately the same size and shape as a corresponding passage through the feedthrough connector 1. Each tubular segment 23' has an exterior wall portion at the circumference of the potting dam 20', to allow a slit to be cut lengthwise for fitting over a wire bundle extending through the associated passage of the feedthrough connector.

FIGS. 9 and 10 illustrate a modification using a hinged clamp 40 to secure the potting dam collars 21 to the stems 4 and 5 of the feedthrough connector 1. Each clamp 40 can be opened to the position illustrated in FIG. 9 or closed to the position illustrated in FIG. 10. The clamps can be releasably held in the position shown in FIG. 10 by use of a standard latch and catch mechanism 41. The clamps can have inturned ribs 42 for engaging over the potting dam collars. In addition, the stems of the feedthrough connector can be provided with additional circumferential grooves 43 toward their outer ends to align with similar inturned ribs 44 of the clamps. FIG. 10 illustrates a clamp 40 in its closed position holding the potting dam collar 21 over the associated connector stem. The wire bundles are not shown in FIG. 10, and typically would have been previously been passed through the feedthrough connector necessitating cutting of the potting dams for insertion of the wire bundles. Alternatively, the potting dams could be secured to the connectors and be retained in position by the clamps at an early stage of manufacture so that wires could thereafter be fed through the potting dams and feedthrough connector, prior to gathering the potting dam tubular segments around the wire bundles, securing them in place, and injecting the potting compound through one of the central conduits.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A system for sealing a plurality of separate wire bundles extending through a hole in a bulkhead, comprising a feedthrough connector secured in the hole and having partitions defining separate passages for the wire bundles, said connector having two stems extending in opposite directions from the bulkhead, two potting dams each having a collar secured tightly on one of said stems without penetrating into said passages of said connector and a plurality of separate tubular segments opening into said collar, said tubular segments being gathered tightly around the wire bundles, at least one of said dams having a conduit opening into the collar of said at least one of said dams, and a quantity of sealant injected through said conduit into said collars and said passages to seal the wire bundles in said connector.

2. The system defined in claim 1, in which the collar and the tubular segments of each of the dams are integral.

3. The system defined in claim 1, in which the tubular segments are formed of a soft pliant polymer.

4. The system defined in claim 3, in which the soft pliant polymer has a shore A hardness between about 55 and about 65.

5. A system for sealing a plurality of separate wire bundles extending through a hole in a bulkhead, comprising a feedthrough connector secured in the hole and having partitions defining separate passages for the wire bundles, said connector having two stems extending in opposite directions from the bulkhead, two potting dams each having a collar secured tightly over one of said stems and a plurality of separate tubular segments opening into said collar, each of said tubular segments having a peripheral wall separate from the peripheral walls of the others of said tubular segments, said peripheral walls of said tubular segments being independently gathered tightly around the wire bundles, at least one of said dams having a conduit opening into the collar of said at least one of said dams, and a quantity of sealant injected through said conduit into said collars and said passages to seal the wire bundles in said connector.

6. The system defined in claim 5, in which said each collar of the two potting dams does not penetrate into the separate passages of the feedthrough connector.

7. The system defined in claim 5, in which the collar and the tubular segments of each of the dams are integral.

8. The system defined in claim 5, in which the tubular segments are formed of a soft pliant polymer.

9. The system defined in claim 8, in which the soft pliant polymer has a shore A hardness between about 55 and about 65.

10. A potting dam for a feedthrough connector secured in a hole of a bulkhead said connector has partitions defining separate passages for separate wire bundles extending through the passages, said potting dam having a collar, structured to be secured tightly over the connector at one side of the bulkhead without penetrating into the separate passages, and separate tubular segments opening into said collar and positioned to be aligned with the separate passages, each of said tubular segments having a continuous peripheral wall adapted to be gathered tightly around a wire bundle, said peripheral walls of said tubular segments being separate and distinct, said tubular segments having cross sections corresponding in size and shape to cross sections of the separate passages through the connector, and a sealant injection conduit opening into the collar of the dam.

11. The dam defined in claim 10, further including a sealant injection conduit opening into the collar of the dam.

12. The dam defined in claim 10, in which each of the tubular segments has an exterior wall portion exposed at the circumference of the potting dam.

13. The dam defined in claim 10, in which the tubular segments have cross sections corresponding to the cross sections of the separate passages through the connector.

14. A method of sealing wire bundles in a hole in a bulkhead, which comprises securing a feedthrough connector in the hole, said feedthrough connector has a central passage for the wire bundles, feeding the wire bundles through the passage, securing a collar of a potting dam at each end of the connector without the collar or any other part of the potting dam penetrating into the passage of the feedthrough connector, gathering a peripheral wall of a tubular segment of the potting dam tightly around each of the wire bundles at said each end of the connector independently of gathering of other tubular segments of the potting dam on other wire bundles, and injecting settable sealant into the potting dam for filling the connector passage and the potting dam collar to seal the wire bundles in the connector.

15. The method defined in claim 14, including maintaining separation of the wire bundles by feeding separate bundles through separate passages through the connector and gathering separate ones of said tubular segment and said other tubular segments of the potting dam at said each end of the connector around separate wires bundles in approximate alignment with the separate passages prior to injecting the sealant.

* * * * *